Aug. 19, 1930.  E. H. LICHTENBERG  1,773,589
BOOM ANGLE INDICATOR FOR CRANES
Filed Feb. 11, 1928  2 Sheets-Sheet 1
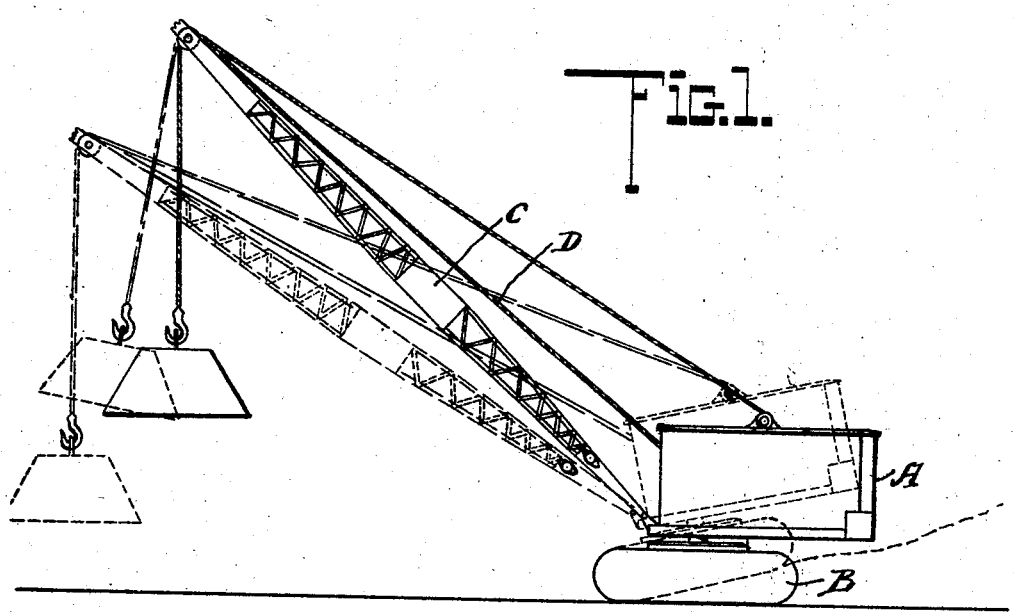
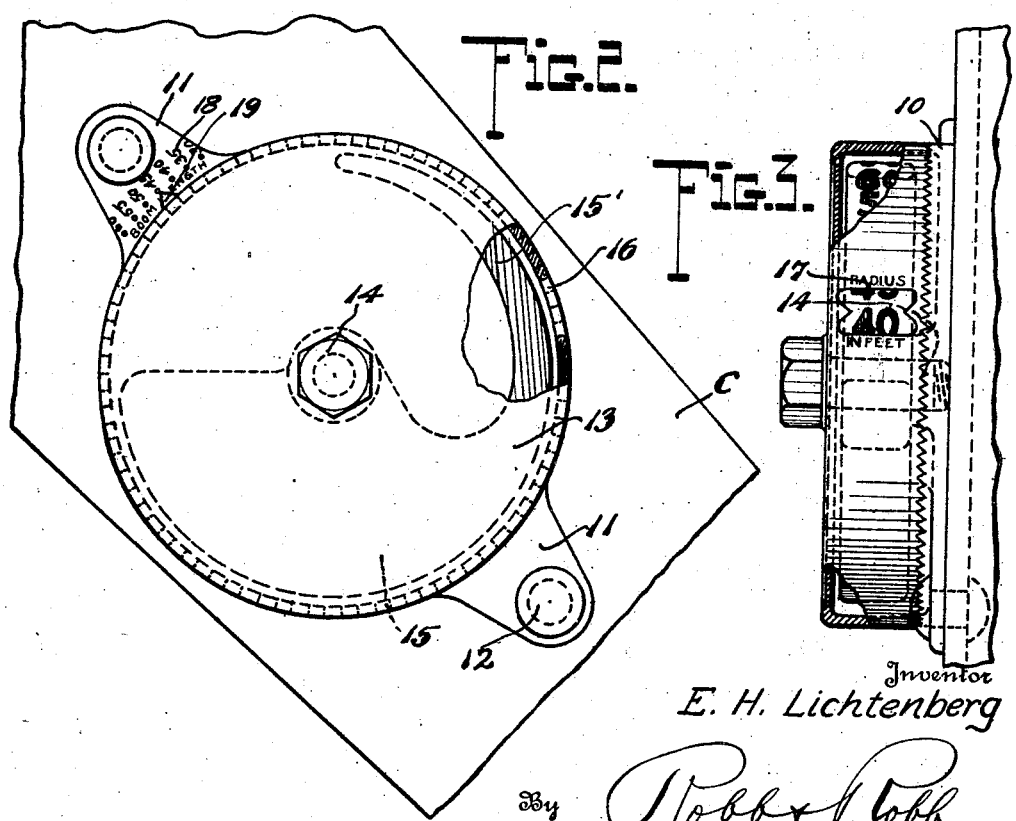
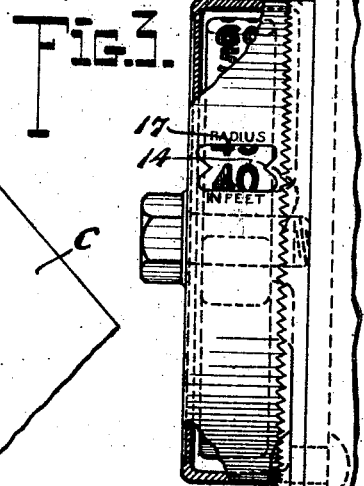
Inventor
E. H. Lichtenberg
By Robb & Robb
Attorneys

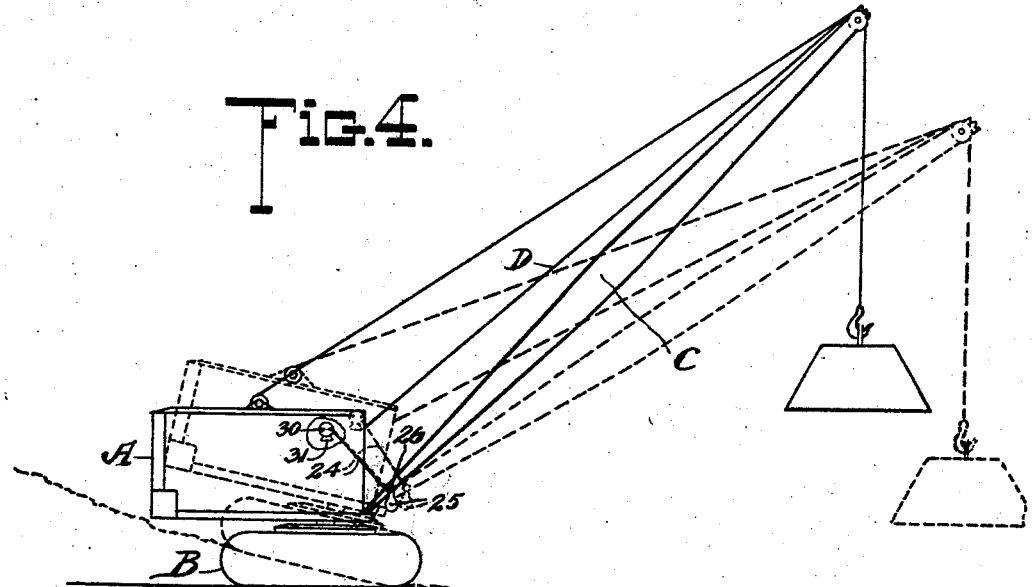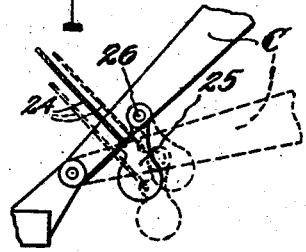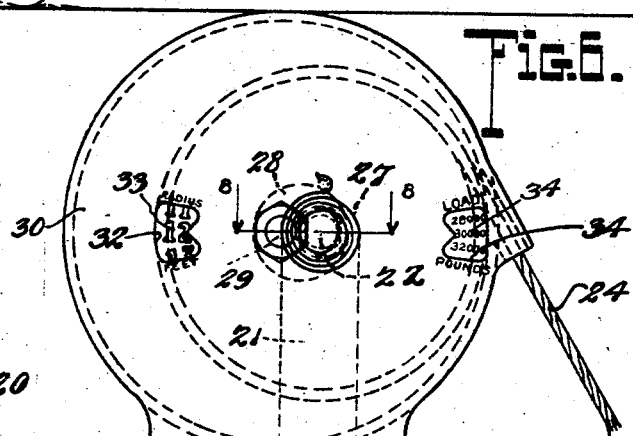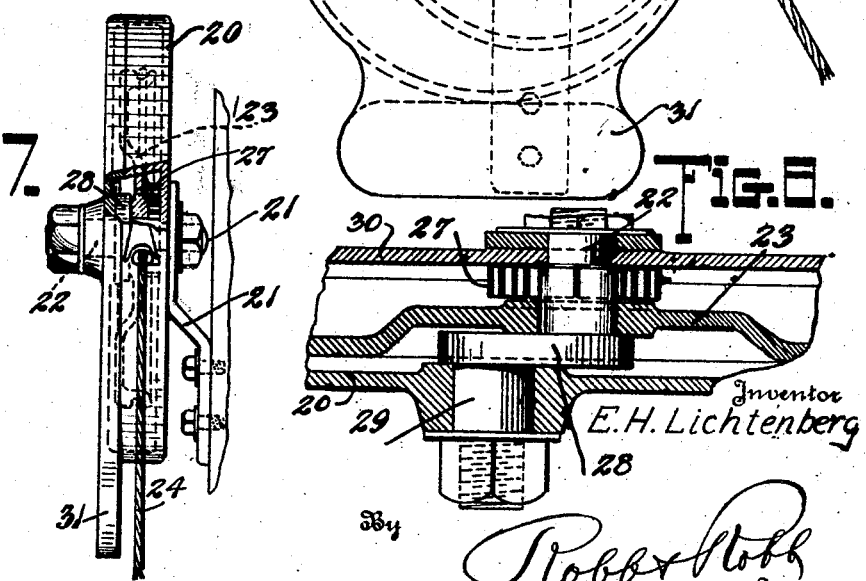

Patented Aug. 19, 1930

1,773,589

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

BOOM ANGLE INDICATOR FOR CRANES

Application filed February 11, 1928. Serial No. 253,669.

The invention herein presented constitutes an indicator device especially designed for use in connection with portable boom excavating and material handling apparatus, by means of which to determine the margin of safety against overloading under working conditions.

At the present time the operator of a machine of the type referred to has no way to determine the working radius of the boom, for example, excepting by guesswork, for even though he may know the length of the boom and the weight of the load to be lifted, there is nothing to definitely indicate the angle of the boom in relation to the ground unless this angle were actually measured—a procedure which would be totally impracticable in the operation of apparatus of this character. Consequently, overloading not infrequently occurs, with the result of overturning of the machine. Either this is likely to occur or, to prevent its occurrence, a conservative operator will operate the machine much below the safe capacity, which is not desirable, economically considered.

Moreover, peculiar conditions of operation may influence the tendency to overturn, such as the position of the apparatus upon an incline where the center of gravity would necessarily be changed from the normal; or the action of centrifugal force in swinging the load with the boom disposed at what would ordinarily be considered a safe angle, will result in tipping the machine. Then too, equally disastrous results occur at times when excavating wet clay or mud, due to the suction factor which is frequently overlooked or underestimated by the operator.

Manufacturers endeavor to prevent accidents of this kind by furnishing with each machine extensive load and radius diagrams or charts, but as before stated, the unknown factor of the angular relation of the boom in respect to the ground makes the application of this data in the specific instance entirely uncertain and impracticable.

The object of these improvements, therefore, is to provide an instrument which in its association with the apparatus enables the operator to determine at all times the working radius of the machine, and by a further adaptation of the device to include an indication of the working load, by which is meant the allowable load which may be lifted, as well as the working radius, so that he may keep well within the maximum safety point of operation under the varying conditions of work.

In carrying out the invention I employ the principle of a free swinging pendulum to obtain the automatic control of the indicator device which may be mounted upon the boom itself or may be affected through remote control from the boom when the indicator device proper is associated with the body of the apparatus.

In the accompanying drawings:—

Figure 1 is a side elevation of a crane embodying my invention and showing in dotted lines the variation in working radii produced by an inclined position of the machine or centrifugal action of the load in swinging;

Figure 2 is a side elevation of the indicator applied to the crane boom;

Figure 3 is an end view thereof;

Figure 4 is a view similar to that of Figure 1, with the modified type of indicator device showing the working radius and load indications;

Figure 5 is a fragmentary view showing the control member on the boom for the modified indicator device;

Figure 6 is a side elevation of the modified indicator;

Figure 7 is an end view thereof; and

Figure 8 is an enlarged fragmentary sectional view on the line 8—8 of Figure 6.

Like reference characters designate corresponding parts throughout the several figures of the drawings.

Referring to the drawings, A designates the swing body of a portable crane, B the traction support for the same, C the boom, and D the hoisting cable, all of conventional construction and well known in the art.

In Figures 2 and 3 the simplified form of indicator is disclosed and comprises the casing or housing composed of the base plate 10 having opposite apertured extensions 11 through which fastening members 12 are passed, and a cover member 13 adjustably secured to the base plate by means of the center bolt 14. Preferably the meeting edges of the cover and base plate are toothed or serrated so as to positively interengage and define a definite adjustment. This casing is secured to the side of the boom at a convenient point near its pivot so as to be within easy view of the operator standing upon the platform of the machine.

Within the casing on the bolt 14 is swung the pendulum member 15 which carries a tail-like extension 15' adapted to operate in relation to a window 16 in the casing cover 13. Upon the peripheral surface of this member suitable indicia 17 is provided, calibrated in proper order and terms representing the working radius. This calibration is necessarily based upon the angle of the boom relative to the surface of the ground and the length of the boom. To enable this to apply to booms of different length requires merely the adjustment of the cover member 13 so as to bring the window 16 into a different position circumferentially in relation to the indicator member 15. Thus with a longer boom, the working radius increases so that the cover member would be shifted counter-clockwise and for a shorter boom, clockwise.

To facilitate this adjustment and enable accurate setting, I prefer to calibrate a base plate extension 11 with indicia representing the length of the boom, as indicated at 18, which, together with the pointer 19 on the cover, will enable the instrument to be adjusted as desired to accord with the boom length.

It will be apparent from the foregoing that as the boom is shifted upwardly or downwardly, the indicator member 15 will shift in relation to the window 16, owing to the tendency of the weight body to maintain its pendent position, and by observing the indicia through the window the operator is always advised of the particular working radius.

When the machine is swung around, centrifugal force acts to extend the working radius but since this force obviously acts upon the pendulum or indicator member 15 to swing it around its support, a higher reading at the window 16 will be presented. Likewise, when the machine tips up, as shown in dotted lines in Figure 1, the reading changes upwardly, because the angle between the boom and the perpendicular line changes, causing the rotation of the indicator member.

In Figures 4 to 8, a modification of the device is shown, wherein not only the working radius is indicated but also the allowable load for that radius, regardless of the angularity of the ground on which the machine may rest. The indicator device in this instance is controlled from the boom and also from the body of the machine. Its construction is unique in that the arrangement is such as to automatically take care of the differential in the rate of decrease of allowable working load as against the rate of increase in the working radius when the machine tips. This will be clear from the description now to be given.

The device comprises a casing member 20 which in this type is mounted within the cab of the machine in line with the axis of rotation of the swing body of the apparatus, the device being secured to the body by means of the bracket 21 to which it is connected by the bolt 22, constituting the axis for an indicator disk or wheel 23 formed with a grooved periphery. This wheel has connected to it a flexible cable 24 which at its other end is connected to a pendulum weight 25 freely suspended at 26 on the boom of the crane adjacent to the pivot end thereof.

As depicted in Figure 5, the swinging of the boom in a vertical plane, or the centrifugal action of the swing of the body of the machine, will cause the weight or control member 25 to pull on the line 24 which rotates the wheel in a clockwise direction. As the pull is released upon the line 24 the wheel is moved counter-clockwise by means of a spiral spring 27 surrounding the support 22 within the casing. This support is provided with an extension 28 from which extends the stud 29 constituting the eccentric axis of the cover member 30. The member 30 is counterweighted by the extension 31 which obviously causes the cover member to swing freely to maintain its vertical axis constantly in a vertical plane. By virtue of the disposition of this weighted cover member in alignment with the axis of rotation of the swinging body of the machine it will not be affected by the centrifugal force exerted in the rotation of the body as will the weight member 25 hereinbefore referred to. It is affected, however, by inclination of the machine.

At one side the cover member is provided with a window 32 through which the indicia 33 on the face of the wheel 23 is observable. This indicia represents the working radius of the machine as referred to in the simple form described hereinbefore, while at an opposite point a second window 34 is provided to present indicia 34' on the other side of the wheel which represents the allowable working load for the particular working radius indication at the first named window. For example, speaking with reference to the disclosure in Figure 6, the position of the indicator wheel shows the particular working radius to be 12 feet, and for that radius the working load allowable is 30,000 pounds. This calibration is worked out, as hereinbefore described, but the point of main importance is the simultaneous indication of the two factors which the operator must have or desires to have to prevent likelihood of overturning of the machine.

The window 32 is closer to the axis of the cover member in this instance than the window 34, for the reason that as the machine tips forwardly the working load will decrease by a fixed ratio more than the working radius increases, owing to the fact that the center of gravity moves forwardly as the machine tips, and thus decreasing the working load at a given radius.

It remains only to be noted that the device may be adapted for booms of greater or less length by merely changing the length of the cable 24.

With a device of this character which so far as I am aware has never been proposed heretofore, the operator of a machine is always apprised of the permissible operations of the machine so that danger of serious accident from overturning may readily be avoided. It should be understood, however, that while I have shown the instrument connected to a crane apparatus, it is not to be understood that it is restricted to this type of machine.

Having thus described my invention, what I claim as new and desire to secure by Letters Patent of the United States, is:—

1. In combination, a portable material handling machine of the class described, an indicator member freely suspended therefrom, and means associated therewith for determining the load capacity in different adjustments of the machine.

2. An indicator of the class described, comprising, in combination, a rotatable member, indicia associated therewith, means tending to rotate the rotatable member in one direction, actuating means for rotating the rotatable member against the action of said first named means, and a pendulum cover member for said rotatable member.

3. In combination, a boom equipped material handling machine, boom adjusting means therefor, an indicator thereon comprising a freely suspended indicating and correcting means, a dial operatively associated with the boom and the suspended means, the suspended means having indicating instrumentalities for determining load and load radius.

4. In combination, a boom equipped material handling machine, boom adjusting means therefor, an indicator thereon comprising an indicating and correcting means, a dial member, a resilient means operatively associated with the dial member, the dial member operatively associated with the boom indicating and correcting means, the dial member having means thereon for determining load and load radius.

5. In combination, a boom equipped material handling machine, boom adjusting means therefor, an indicator thereon comprising an indicating and correcting means, a dial member, a weighted member, a connecting means, the connecting means operatively associated with the dial and the weighted member and also the indicating and correcting means, the indicating and correcting means having instrumentalities for determining load and load radius.

6. In combination, a portable material handling machine of the class described, an indicator member freely mounted on said material handling machine, a disc mounted to rotate into an adjusted position with respect to the indicator member, means to retain the indicator in its cooperative relation with the disc upon the adjusted movement of the material handling machine, and means to control the operation of the disc so that it will determine the load capacity in varied adjustments of the machine.

In testimony whereof I affix my signature.

ERICH H. LICHTENBERG.